July 30, 1946.  T. G. McKEEN  2,404,856
RODENT TRAP
Filed April 27, 1945
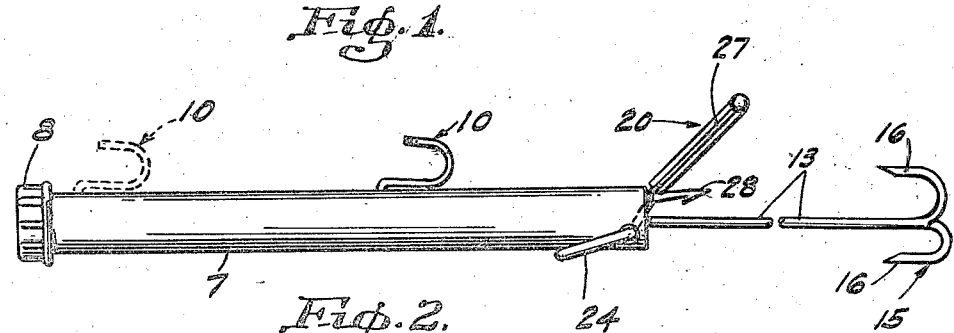
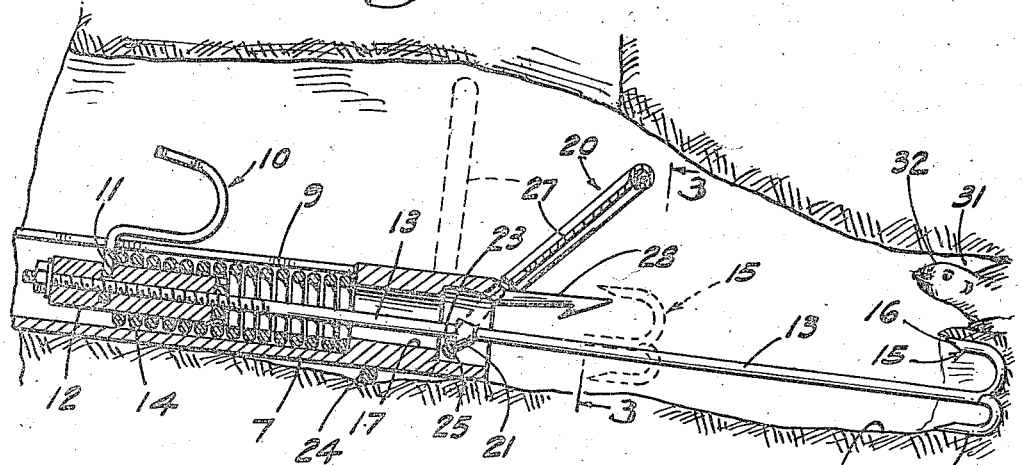
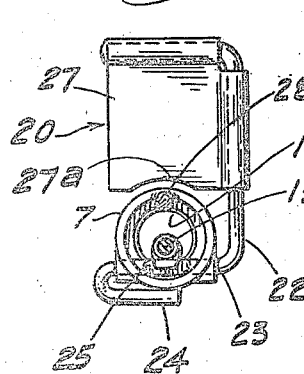
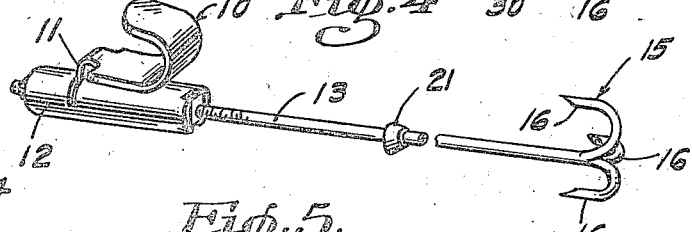
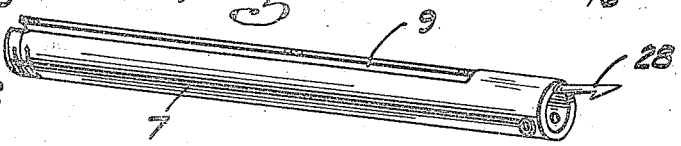
Thomas G. McKeen,
INVENTOR.
By Albert H. Merrill
ATTORNEY.

Patented July 30, 1946

2,404,856

UNITED STATES PATENT OFFICE 2,404,856

RODENT TRAP

Thomas G. McKeen, Torrance, Calif.

Application April 27, 1945, Serial No. 590,532

10 Claims. (Cl. 43—80)

This invention relates to a rodent trap.

More specifically speaking the invention pertains to a type of rodent trap wherein spring actuated means causes one or more pointed members to penetrate the body of the animal, the device being actuated by a trigger which the animal releases when it emerges from a hole or burrow in the ground.

It is an object of the invention to provide an improved combined body-gripping and body-piercing or impaling means, so that when the trap is released the body of the animal will be both pierced and gripped thus making it doubly sure that it will not escape from the trap.

Another object relates to the provision of an improved relative positioning of the trigger of the trap in relation to the body-gripping and body-piercing members so that, when the animal releases the trigger, its body will at such time be positioned directly in the path of the spring-actuated body-gripping and body-piercing means.

A further object is to provide a more efficient trap for catching the gopher as it emerges from its burrow, this animal being a serious menace to agriculture in many sections of the United States.

Other objects, advantages and features of invention will hereinafter appear.

Referring to the accompanying drawing which illustrates what at present is deemed to be a preferred embodiment of the invention, Fig. 1 is a side elevation of the trap showing it in the set condition.

Fig. 2 is a longitudinal mid-section showing the trap in the set position and including in the view the mouth portion of a gopher's burrow together with the recess in the soil which the operator will make in order to lower the trap to the proper set position. Parts are broken away in order to shorten the view and the hooked portion of the spring-operated shaft is shown in full lines in the set position and in dotted lines in the released position.

Fig. 3 is a cross section on line 3—3 of Fig. 2.

Fig. 4 is a perspective view of the spring driven, hooked rod and parts carried thereby.

Fig. 5 is a perspective view of the barrel of the trap and of the stationary impaling member carried thereby, this view, like Fig. 1, being on a smaller scale than the remaining views.

Referring in detail to the drawing, the barrel 7 of the trap, constituting an elongated mounting member, is shown closed at one end by a cap 8 and has a longitudinal slot 9 cut through it from a point adjacent to said cap to a point spaced away from the opposite end of said barrel, this slot being sufficiently long to provide for the travel of the manually operable setting arm or clip 10 having a shank 11 extending through said slot. Said shank 11 is made fast to a cylindrical head 12 slidable within the barrel and fixed to the hook-carrying rod 13, the diameter of said head being considerably less than the internal diameter of the barrel 7 so as to provide an annular space to receive loosely the adjacent end portion of the operating spring 14, of the spiral, compression type. The end portion of rod 13 opposite to its head 12 carries a multiple hook structure 15, three pointed hooks 16 being shown spaced 120 degrees apart. One end of spring 14 bears against shank 11 and the opposite end of said spring bears against the annular shoulder resulting from internally thickening the wall of the barrel as indicated at 17.

A rodent-releasable catch means is provided which includes a trigger member 20 to releasably maintain the rod 13 in its extended, set position against the opposition of the spring 14, said trigger member cooperating with a catch or shoulder 21 drop-forged or otherwise formed upon the rod. As best shown in Fig. 3 said trigger member comprises a wire 22 so bent that three runs thereof outline both ends and one side of an elongated rectangle, one of said runs 23 of said wire having a terminal portion 24 which is bent back in such a way as to cooperate with the adjacent side portion of the barrel to act as a stop to limit the swing of the trigger member when it moves to set position.

The already mentioned wire run 23 passes transversely and turnably through the adjacent end portion of the barrel and is provided with a catch shoulder 25 to cooperate with the catch lug 21 carried by rod 13. The opposite end portion of the trigger member 20 is shown carrying an apron 27 which insures that the rodent will release said trigger either by moving dirt or his body against said apron.

A stationary impaling spur 28 is shown carried by the open end portion of the barrel positioned to penetrate the side of the rodent's body opposite to that entered by the hooks 16 when the animal releases the trigger.

To set the hook-carrying rod 13 in its extended position the operator, while using one hand to hold the barrel with its open, spur-carrying end directed downwardly, will use his other hand to force the setting clip 10 toward said end of the barrel from the dotted to the full line position of Fig. 1. When said clip reaches the latter position the catch shoulder 21 carried by the rod 13 will assume set position in relation to the catch shoulder 25 on the wire run 23, as shown in Fig. 2. Then the trap will be stationed in the position shown in the latter view in a shallow dug-out recess 30 made in the lower portion of the burrow 31 from which the rodent 32 is expected to emerge, pushing a considerable quantity of dirt ahead of it, if a "pocket" gopher. The extensible portion of the rod 13 is made sufficiently long to insure that when the trigger is released the body of the rodent will be in advance of said hooks 16 and between them and the stationary spur 28. As the trigger releases, the wire arm 24 under the barrel 9 raises the adjacent end of the trap, particularly the spur 28, making a combined gripping and impaling of the rodent more certain. This raising of the trigger-carrying end of the barrel results from the fact that the wire 24 is spaced considerably away from and swings downwardly about the pivot afforded by the wire run 23 when the rodent swings backwardly the trigger 20 formed by the opposite end portion of the same piece of wire. This movement is accelerated the moment that the catch member 21 carried by the rod 13 slides upwardly across the then tilted flat shoulder 25 of the wire run 23, under the urge of the strong spring 14.

The apron 27 is shown having an arcuate recess 27a in its lower edge to clear the upper side of the barrel sufficiently to allow the trigger the desired length of swing.

I claim:

1. In a rodent trap, an elongated mounting member, a longitudinally movable rod supported by said member to move back and forth in relation to the length of the latter, a spring acting between said member and rod to move the rod in one direction, said rod being manually movable against the opposition of said spring to a set position, a rodent-releasable catch carried by said member to maintain said rod in the set position, and hook means carried by said rod to cooperate with said member to grip the rodent between said hook means and member when the rodent releases said catch.

2. The subject matter of claim 1, and said hook means having at least one point portion positioned to enter the body of the gripped rodent.

3. The subject matter of claim 1, and said mounting member having a spur positioned to enter the body of the rodent when the latter is gripped as aforesaid.

4. In a rodent trap, a barrel, a longitudinally movable rod mounted in said barrel to move back and forth in relation to the length of the latter, a spring acting between said barrel and rod to move the latter in one direction, said rod being manually movable to a set position against the opposition of said spring, a rodent-releasable catch carried by said barrel to maintain said rod in the set position, and hook means carried by said rod to cooperate with said barrel to grip the rodent when it releases said catch.

5. The subject matter of claim 4, and a spur projecting axially from said barrel in a position to enter the body of the gripped rodent.

6. The subject matter of claim 4, and said catch means including a wire trigger carrying an apron positionable in the path of the rodent.

7. In a rodent trap, a barrel having a longitudinal slot through its side, a rod reciprocable lengthwise of said barrel, one portion of the length of said rod being at all times contained within said barrel, and another portion thereof being extensible from said barrel, a hook carried by said extensible portion of said rod and having a point portion to penetrate a trapped rodent, a spring within said barrel to retract said rod and thereby force the point portion of said hook into the rodent, a setting member secured to said rod and projecting loosely through said slot for manually extending the rod against the opposition of said spring, and catch means to releasably hold said rod in an extended set position, a part of said catch means being swingably supported by said barrel and being positioned for being released by the rodent when its body enters the space into which the point of said hook travels under the urge of said spring when the catch means is released.

8. In a rodent trap, a barrel having a longitudinal slot through its side, a rod reciprocable lengthwise of said barrel, one portion of the length of said rod being at all times contained within said barrel, and another portion thereof being extensible from said barrel, a hook carried by said extensible portion of said rod and having a point portion to penetrate a trapped rodent, a spring within said barrel to retract said rod and thereby force the point portion of said hook into the rodent, a setting member secured to said rod and projecting loosely through said slot for manual extension of the rod against the opposition of said spring, and catch means to releasably hold said rod in an extended set position, a part of said catch means being swingably supported by said barrel and being positioned for being released by the rodent when its body enters the space into which the point of said hook travels under the urge of said spring when the catch means is released, said catch means comprising a wire having end portions and an intermediate run which is directed transversely of said barrel and extends turnably therethrough, there being two cooperating catch shoulders, one on said run and the other on said rod, one of said end portions of said wire being abuttable against said barrel to maintain the catch means in set position and the opposite end portion of said wire forming a trigger operable by the rodent to release said catch means.

9. In a rodent trap, an elongated mounting member, a longitudinally movable rod supported by said member to move back and forth in relation to the length of the latter, a spring acting between said member and rod to move the rod in one direction, said rod being manually movable against the opposition of said spring to a set position, a rodent-releasable catch carried by said member to maintain said rod in the set position, a trigger carried by said member to release said catch, said trigger at all times projecting laterally from said member, and hook means carried by said rod to cooperate with said member to grip the rodent between said hook means and mounting member when the rodent releases said catch.

10. In a rodent trap, a barrel, a longitudinally movable rod mounted in said barrel to move back and forth in relation to the length of the latter, a spring acting between said barrel and rod to move the latter in one direction, said rod being manually movable to a set position against the opposition of said spring, a catch carried by said barrel releasably to maintain said rod in the set position, hook means carried by said rod to cooperate with said barrel to grip the rodent when said catch is released, and a trigger carried by said barrel in a position to release said catch, said trigger, when the trap is set, projecting laterally from said barrel into the path of the rodent.

THOMAS G. McKEEN.